(Model.)
W. N. FORT & J. A. SCOTT.
Animal Trap.
No. 242,912.   Patented June 14, 1881.
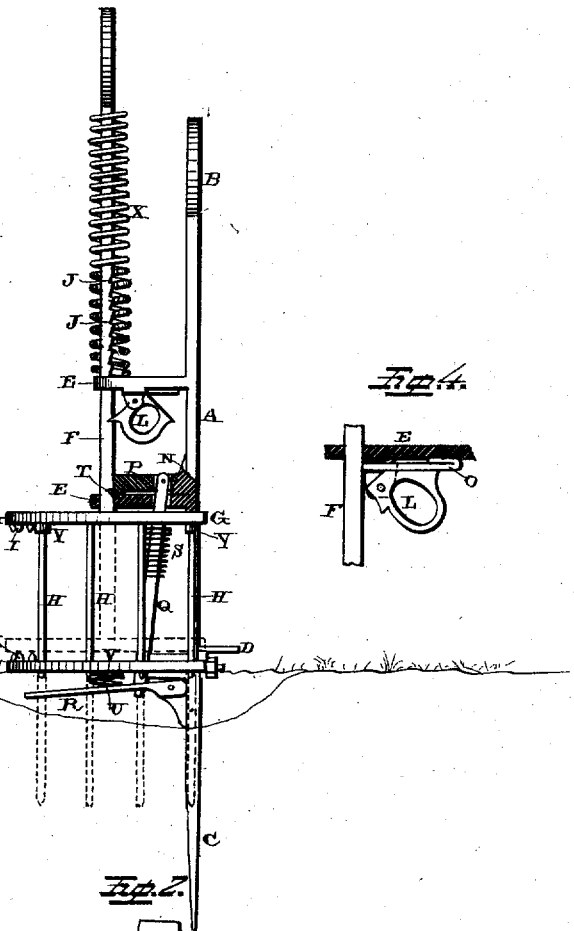
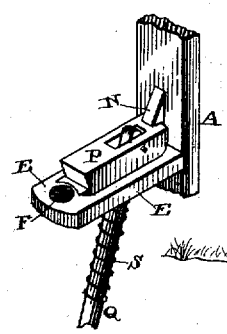
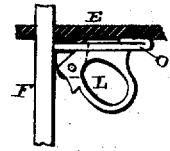
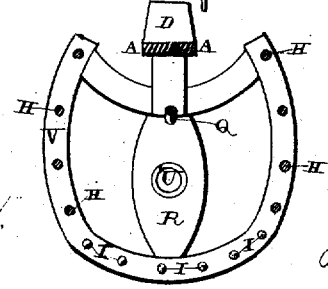

UNITED STATES PATENT OFFICE.

WILSON N. FORT AND JAMES A. SCOTT, OF HURRICANE HILL, ARKANSAS.

ANIMAL-TRAP.

SPECIFICATION forming part of Letters Patent No. 242,912, dated June 14, 1881.

Application filed March 28, 1881. (Model.)

*To all whom it may concern:*

Be it known that we, WILSON N. FORT and JAMES A. SCOTT, of Hurricane Hill, in the county of Lafayette and State of Arkansas, have invented certain new and useful Improvements in Traps; and we do hereby declare the following to be a full, clear, and exact description of the invention, such as will enable others skilled in the art to which it pertains to make and use it, reference being had to the accompanying drawings, which form part of this specification.

Our invention relates to an improvement in traps; and it consists in the combination of a mole or impalement trap and pair of toothed jaws, whereby the trap can be set for either moles or other animals.

It further consists in forming notches in the side of the spring-actuated vertically-moving shaft, and using in connection therewith a spring-stop, which prevents the rod from being raised upward, whereby the animal might free itself from the jaws after it had been caught.

It still further consists in the peculiar construction of the trigger and the method of operating it, all of which will be more fully described hereinafter.

The object of our invention is to combine a trap for catching animals with a mole-trap, so that the trap will perform a double duty and thus be equally adapted for catching two different classes of animals.

Figure 1 is a side elevation partly in section. Fig. 2 is a horizontal section taken through the trap just above the lower jaw. Figs. 3 and 4 are detail views.

A represents a standard, which is provided with a suitable handle, B, at its upper end and a sharp point, C, for pushing down into the ground. Secured to the outer side of the standard is a projection, D, upon which the foot is placed for the purpose of forcing the lower end of the standard down into the ground. Projecting from the inner side of this standard are the two guides E, through which a vertically-moving spring-actuated rod, F, passes. To the lower end of this rod is secured a flat plate, G, which is provided with a series of sharp spikes, H, for entering the ground and killing moles, and a series of short teeth, I. In the inner side of this spring-actuated rod are made a number of notches, J, for the spring-stop L to catch in for the purpose of preventing the rod from being raised upward after the trap has once been touched off, until the spring is turned back out of contact with the rod. This spring-stop is pivoted to the under side of the upper guide, and is adapted to be turned back so as not to interfere with the rod in any manner. The object of this stop is to catch in the notches cut in the side of the spring-actuated rod and prevent the rod from being raised upward after the trap has been touched off, and thus prevent large animals from raising the toothed plate or frame in their struggles, and thus escaping. As this stop can be pressed by means of a spring, O, constantly against the side of the spring-rod, and as the notches or ratchets are all inclined in one direction the stop allows the rod to freely descend, but prevents it from being raised upward by catching in one of the notches with its sharp point.

Upon the top of the lower guide is formed an incline, N, and resting upon the top of this guide is the trigger P, which has its inner end bifurcated so as to straddle over the top of this incline. This trigger is pivoted upon the upper end of the rod Q which connects the trigger with the pivoted piece R, upon which the bait is placed. Secured to this connecting-rod, and bearing up against the under side of the guide, is a coiled spring, S, which serves to pull the trigger downward, and by forcing its bifurcated end down upon the incline to have its front end forced against the side of the spring-actuated rod, so that it will catch in the notch T, which is made in the rod at its lower end.

Upon the top of the pivoted piece R there is secured a coiled spring, U, by means of which the bait is securely held in position, so that the animal in attempting to take the bait, or a mole in attempting to pass under this piece, will raise it upward, and thereby raise the inner end of the trigger upward from the incline N.

The bait is fastened to the spring U by turning the bait around while it is being pressed down upon the top of the spring, and the spring will then enter it like a screw. This bait is intended for animals that may be prowling around on the surface of the ground, and not for the moles.

As the connecting-rod is moved upward it raises the inner end of the trigger upward along the incline, and thus draws the outer end of the trigger inward, so as to release it from the notch in which it is caught. As soon as the inner end of this trigger is released from the rod a spring drives the rod downward with sufficient force to drive the sharp spikes into the mole that is passing under the piece R, or to force the upper jaw down upon the lower one, V, so that the animal attempting to take the bait will be caught between the two sets of sharp teeth I.

The under jaw, V, serves as a guide for the long spikes or teeth which are forced into the ground, and is provided with a set of short teeth, I, which correspond with the teeth upon the upper jaw. This lower jaw is secured to the inner side of the standard A by means of the same clamping-bolt which holds the foot-rest in place.

The operation of our trap is as follows: The lower end of the standard A is first forced down into the ground until the piece R upon which the bait is secured rests upon the top of the ground. The upper end of the spring-actuated rod is then taken hold of and the rod is drawn upward until the trigger catches in the notch which is made in its lower end. In this position the trap is ready to kill either a mole which is passing under it, or to catch any animal which may be running around upon the top of the ground. Should the mole attempt to pass along under the piece R the upward movement of the earth will raise the piece R upward far enough to draw the outer end of the trigger out of the notch in the rod, and the rod will then descend from the force of the spring X, which is applied to its outer end, and force the long sharp spikes down into the mole. The spring-stop, which has its sharp point held in contact with the rod, catches in one of the notches in the side of the rod, and thus prevents the rod from being raised upward in the struggle of the mole to escape. Should an animal upon the top of the ground attempt to take the bait from off the piece R by inserting its head in between the two jaws G V, so as to reach the bait which is fastened to the coiled wire U, it will raise the piece R upward, when its head will be caught between the two jaws and held by the two sets of sharp teeth I. Before the captured animal can be released from the spikes or short teeth it will be necessary to press the spring-catch backward, so as to allow the rod to be raised upward.

Passed over suitable ones of the long spikes, in between the two jaws, are pieces of rubber Y, which prevent the jaws from coming in contact with each other with such force as to injure or break them or jar the other piece out of position.

It will be seen that our trap while set for one kind of game is equally adapted for catching another, and is thus made to perform a double function.

Having thus described our invention, we claim—

1. A mole-trap provided with a set of sharp spikes for penetrating the ground, and a pair of jaws provided with sharp teeth I, in combination with a spring-actuated rod, a trigger for holding the rod in a raised position, and the piece R, provided with a device for holding the bait, substantially as shown.

2. In a trap provided with jaws, the combination of a spring-actuated rod having notches cut in its side, with a spring-stop for catching in one of the notches, to prevent the rod from being raised upward again, substantially as described.

3. In a trap, the combination of a standard, A, provided with suitable guides, a spring-actuated rod having a notch in its lower end, the incline N, the trigger P, the connecting-rod and spring, the piece R, upon which the bait is placed, and a device for holding the bait, substantially as set forth.

4. In a trap, the combination of the jaws provided with a series of spikes and a separate set of sharp teeth I, and a suitable mechanism, substantially as described, for operating them, whereby the trap is adapted for catching game either on top of or under the ground, substantially as specified.

5. In a trap, the combination of trigger P, for supporting the rod F in an elevated position with the incline N, which fits in the bifurcated end of the trigger, the rod Q, spring S, and the part R, substantially as shown.

In testimony whereof we affix our signatures in presence of two witnesses.

WILSON NELMS FORT.
JAMES APHONZO SCOTT.

Witnesses:
  B. P. WHEAT,
  R. C. WARREN.